US011870168B2

(12) United States Patent
Stemplinger et al.

(10) Patent No.: US 11,870,168 B2
(45) Date of Patent: Jan. 9, 2024

(54) BOARD TO BOARD CONNECTOR ASSEMBLY FOR HF SIGNAL TRANSMISSION

(71) Applicant: HUBER+SUHNER AG, Herisau (CH)

(72) Inventors: Florian Stemplinger, Kreuzlingen (CH); Martin Wagner, Steinach (CH)

(73) Assignee: HUBER+SUHNER AG, Herisau (CH)

(*) Notice: Subject to any disclaimer, the term of this patent is extended or adjusted under 35 U.S.C. 154(b) by 201 days.

(21) Appl. No.: 17/289,643

(22) PCT Filed: Nov. 12, 2019

(86) PCT No.: PCT/EP2019/080973

§ 371 (c)(1),
(2) Date: Apr. 28, 2021

(87) PCT Pub. No.: WO2020/099374

PCT Pub. Date: May 22, 2020

(65) Prior Publication Data

US 2021/0399447 A1 Dec. 23, 2021

(30) Foreign Application Priority Data

Nov. 12, 2018 (CH) ........................................ 1389/18
Aug. 22, 2019 (CH) ........................................ 1046/19

(51) Int. Cl.
*H01R 12/70* (2011.01)
*H01R 13/6594* (2011.01)
(Continued)

(52) U.S. Cl.
CPC ..... *H01R 12/7082* (2013.01); *H01R 12/7005* (2013.01); *H01R 12/73* (2013.01);
(Continued)

(58) Field of Classification Search
CPC ............ H01R 12/7082; H01R 12/7005; H01R 12/73; H01R 13/6594; H01R 24/48;
(Continued)

(56) References Cited

U.S. PATENT DOCUMENTS 2,759,041 A * 8/1956 Cox ........................ H01B 3/082
439/453
3,848,164 A * 11/1974 Otte ........................ H01R 24/52
333/24 C
(Continued)

FOREIGN PATENT DOCUMENTS

CN 102576955 A 7/2012
CN 102714385 A 10/2012
(Continued)

OTHER PUBLICATIONS

Chinese Patent Office (CNIPO), Bejing, P.R. China, Office Action for Chinese Application No. 201980070568.1, dated Jul. 4, 2022 (13 pages).
(Continued)

*Primary Examiner* — Abdullah A Riyami
*Assistant Examiner* — Justin M Kratt
(74) *Attorney, Agent, or Firm* — Pauley Erickson & Swanson

(57) ABSTRACT

A board to board connector assembly (1) includes a first connector (2) suitable to be arranged on a first printed circuit board (3) and a second connector (4) suitable to be arranged on a second printed circuit board (5). An adapter (6) is arranged in a mounted position between and interconnected to the first and the second connector (2, 4). The adapter (6) includes an adapter inner conductor (7) and an adapter outer conductor (8). The adapter outer conductor (8) is arranged
(Continued)

separate from the adapter inner conductor (7) and comprises a bore (18) in which the adapter inner conductor (7) is arranged.

26 Claims, 3 Drawing Sheets

(51) Int. Cl.

| | |
|---|---|
| ***H01R 24/50*** | (2011.01) |
| ***H01R 24/54*** | (2011.01) |
| ***H01R 12/73*** | (2011.01) |
| ***H01R 24/48*** | (2011.01) |
| *H01R 12/53* | (2011.01) |
| *H01R 12/51* | (2011.01) |
| *H01R 12/91* | (2011.01) |
| *H01R 103/00* | (2006.01) |
| *H01R 13/6591* | (2011.01) |
| *H01R 13/6592* | (2011.01) |
| *H01R 24/40* | (2011.01) |

(52) U.S. Cl.
CPC ......... *H01R 13/6594* (2013.01); *H01R 24/48* (2013.01); *H01R 24/50* (2013.01); *H01R 24/542* (2013.01); *H01R 12/51* (2013.01); *H01R 12/53* (2013.01); *H01R 12/7052* (2013.01); *H01R 12/91* (2013.01); *H01R 13/6591* (2013.01); *H01R 13/6592* (2013.01); *H01R 24/40* (2013.01); *H01R 2103/00* (2013.01)

(58) Field of Classification Search
CPC ...... H01R 24/50; H01R 24/542; H01R 12/51; H01R 12/53; H01R 12/7052; H01R 12/91; H01R 13/6591; H01R 13/6592; H01R 24/40; H01R 2103/00
See application file for complete search history.

(56) References Cited

U.S. PATENT DOCUMENTS

| | | | | |
|---|---|---|---|---|
| 4,938,714 | A * | 7/1990 | Kawai ................ | H01R 13/6582 439/607.17 |
| 5,791,911 | A | 8/1998 | Fasano et al. | |
| 5,820,390 | A | 10/1998 | Takamoto et al. | |
| 6,497,579 | B1 | 12/2002 | Garbini | |
| 6,951,482 | B1 | 10/2005 | Miller et al. | |
| 6,994,563 | B2 | 2/2006 | Amini et al. | |
| 7,491,069 | B1 | 2/2009 | Di Stefano et al. | |
| 8,801,459 | B2 | 8/2014 | Mrowka | |
| 9,300,063 | B2 | 3/2016 | Tatzel et al. | |
| RE46,958 | E | 7/2018 | Vinther et al. | |
| 2007/0190668 | A1 | 8/2007 | Cloet et al. | |
| 2008/0085632 | A1 | 4/2008 | Benham | |
| 2011/0039448 | A1* | 2/2011 | Stein .................... | H01R 24/542 439/578 |
| 2014/0004722 | A1* | 1/2014 | Stein ...................... | H01R 43/00 29/874 |
| 2014/0329421 | A1 | 11/2014 | Tatzel et al. | |
| 2015/0118899 | A1 | 4/2015 | Hügel et al. | |
| 2015/0118904 | A1 | 4/2015 | Baechie et al. | |
| 2021/0399452 | A1 | 12/2021 | Wagner et al. | |

FOREIGN PATENT DOCUMENTS

| | | | | |
|---|---|---|---|---|
| CN | 202662847 | U | | 1/2013 |
| CN | 202732640 | U | * | 2/2013 |
| CN | 202732640 | U | | 2/2013 |
| CN | 206116672 | U | | 4/2017 |
| CN | 107819262 | A | | 3/2018 |
| CN | 108346874 | A | | 7/2018 |
| CN | 108346876 | A | | 7/2018 |
| DE | 102017002307 | A1 | | 9/2018 |
| EP | 0 793 299 | A1 | | 9/1997 |
| EP | 2 780 985 | | | 9/2014 |
| EP | 3 198 686 | A1 | | 8/2017 |
| JP | H 02-98074 | A | | 4/1990 |
| JP | 2010-050653 | A | | 3/2010 |
| WO | WO 2017/059950 | A1 | | 4/2017 |

OTHER PUBLICATIONS

EPO (Riswijk, NL), English language version of the International Search Report, Form PCT/ISA/210, for International Application PCT/EP2019/080973, dated Feb. 6, 2020 (03 pages).
European Patent Office, EPO, Office Action for European Application No. 19 802 168.5, dated Aug. 7, 2023 (38 pages).

* cited by examiner

BOARD TO BOARD CONNECTOR ASSEMBLY FOR HF SIGNAL TRANSMISSION

CROSS REFERENCE TO RELATED APPLICATION

This application is a National Phase filing in the United States, under 35 USC § 371, of PCT International Patent Application PCT/EP2019/080973, filed on 12 Nov. 2019 which claims the priority of Swiss Patent Application CH 01389/18, filed 12 Nov. 2018 and Swiss Patent Application CH 01046/19, filed 22 Aug. 2019.

These applications are hereby incorporated by reference herein in their entirety and is made a part hereof, including but not limited to those portions which specifically appear hereinafter.

BACKGROUND OF THE INVENTION

Field of the Invention

The present invention relates to a coaxial board to board (B2B) connector assembly for high frequency signal transmission between two printed circuit boards (PCB-boards).

Discussion of Related Art

EP3198686 was first published in December 2015 on behalf of Rosenberger Hochfrequenztechnik GmbH. It is directed to a connector for a HF signal-transmitting connection of two components. In particular, a board to board connector for the HF signal-transmitting connection of two circuit boards to each other, comprises a first connecting piece for fastening to the first components and a second connecting piece for fastening to the second component. An intermediate piece includes a first end for connection to the first connecting piece and a second end for connection to the second connecting piece. In order to form a decent connection for fixing the connection, the first connecting piece and the second connecting piece each comprise a first detent means. The first end is designed to be free from detent means and the second end comprises a second detent means designed for interacting with the first detent means.

US RE46958E was first published in July 2018 on behalf of Ardent Concepts Inc. It is directed to an apparatus for terminating a controlled impedance cable using compliant electrical contacts to provide an interface to another device. The terminator includes an anchor block for securing the cable. Optionally, the anchor block is electrically non-conductive. A conductive ferrule is installed on the cable shield and the cable end is dressed. The ferrule/cable assembly is installed in a through hole in the anchor block so the cable end is flush with the anchor block face. An insulating or conductive plate mounted to the anchor block holds the signal contact that electrically connects the center conductor to the device and optional ground contacts that electrically connect the ferrule to the device.

US 2008085632 was first published in April 2008 on behalf of Winchester Interconnect Corp. It is directed to a connector apparatus for connecting a plurality of cables to a circuit board. The connector apparatus comprises a frame, a plurality of holes in the frame. Each hole extends from a first surface of the frame to a second surface of the frame, which second surface faces in a direction opposite of the direction in which the first surface faces. Each hole being configured to house an end portion of one of the plurality of cables, wherein the plurality of holes forms a plurality of rows of holes, wherein, for each of the rows, all holes in the row are arranged in a straight line.

U.S. Pat. No. 6,951,482 was first published in September 2005 on behalf of Xcerra Corp. It is directed to an interconnection structure which includes a positioning block and a dielectric substrate. A coaxial cable has an end segment that is fitted in a passage in the positioning block and the positioning block is so positioned relative to the dielectric substrate that an end face of the inner conductor of the coaxial cable is presented towards a conductive element on a main face of the substrate. A discrete resilient contact element is interposed between the end face of the inner conductor and the conductive element and in electrically-conductive pressure contact with both the inner conductor and the conductive element.

U.S. Pat. No. 6,994,563 was first published in June 2005 on behalf of IBM. It is directed to a signal channel which extends from a motherboard to a daughter card across an edge connection. The daughter card includes a conductive plane that is held at a constant electrical potential. In order to compensate for a number of sources of inductance within the signal line at the edge connection, a circuit trace forming a portion of the signal channel includes an enlarged portion, spaced inward along the daughter card from the contact tabs forming the edge connection, that adds capacitive coupling of the signal channel with the conductive plane.

SUMMARY OF THE INVENTION

The evolution in mobile communication systems (e.g. 5G) results in the need to increase spectrum efficiency during broadcasting over the air. One key element is introducing massive mimo (multiple in multiple out) antenna systems where multiple radiators within one antenna receive and transmit in the same channel, but individually controlled in phase and amplitude and so allowing adaptive beamforming even in a complex dynamic environment with multiple obstacles and with different absorbing and reflecting surfaces. Furthermore, pedestal station antennas are limited in size, weight and visual impact. So as counter measure to allow use of (massive) more radiators per channel, it is highly desired to use radiators for different frequency bands collocated on the same (larger) antenna instead of having one antenna per frequency band.

Today mimo-antenna architecture preferably uses a first printed circuit board (PCB), the so called digital PCB, on which all signal processing is located on. In addition, usually for each individual radiator a transceiver is arranged as close as possible to the radiator to minimize signal transmission losses. With the huge amount of signal processing and the collocation of tens of transceivers, a careful shielding concept including several metal shielding compartments (e.g. Aluminum die cast) needs to be conductively attached to the printed circuit board. Where signals need to be fed-trough of the metal shielding compartments (holes) with board to board connectors additional electromagnetic shielding (shielding washer, rubber gaskets) is required to not compromise the electromagnetic compatibility.

The radiators are preferably arranged on a different, second printed circuit board, the so called Radio Frequency-PCB (or RF-PCB), which is responsible to interconnect the radiating elements. Between the first, digital PCB and the second, RF-PCB, the radio frequency signals (RF signals) are usually transmitted by board to board interconnectors (MBX, MFBX, EBC) which are capable to compensate the misalignment tolerances within this architecture. Furthermore, depending on the duplex schema additional filter or duplexer may be located between these PCB's (needing additional board to module interconnectors).

Besides the above considerations, 5G massive mimo structures require 16, 32, 64 or even more (up to 128) board to board connections. Compared to 4G standard, this is approximatively eight times more connections. Depending on country, regions different frequency levels and thus different sizes of components (e.g. filter, power amplifier, etc.) high flexibility on the distance between board to board or between board and filter is required, e.g. 15 mm to 50 mm. Based on customer projects or even based on used channels (e.g. calibration channel) there is also a need for lower quantities. Board to board connectors, as known today usually comprise three pieces which can be summarized as follows: Two PCB-connectors and one barrel/bullet adaptor in between and interconnecting the PCB-connectors.

With today's available connections (MFBX, EBC) extensive length flexibility is achieved by adjusting the bullet/barrel length. Challenges today are high expenses as well as reduced length flexibility due to already used tool based technology like stamp and bending. At the same time customers are forced to use shielding washer, gaskets. On the other hand, the market tries to integrate in a higher level by using spring loaded pins (pogo pins) as center contact including insulator. The problem behind those solutions are length flexibility of spring loaded contacts, the worse Return Loss performance due to radial misalignments between PCB pad and spring loaded pin as well as the problem of having no solution to contact the shielding cover by guaranteeing axial misalignment compensation to the PCB outer contact pad. A direct and good electrical contact with a shielding cover, which is preferably made out of aluminum die cast, and PCB pad is very difficult to achieve especially over time with temperature changes and humidity and therewith deteriorating contact (e.g. oxidation). Besides solutions for very long distances also solutions for very short distances (<5 mm) are needed for future application within 5G.

Today, there are no economic board to board connections available which allow to contact comparatively short board to board distances. Most solutions concentrate on the above described three-piece design, which requires a minimum distance which cannot be underrun.

The present invention is directed to a one-piece to three-piece integrative solution, which, if appropriate, can use an existing shielding cover as described hereinafter as coaxial outer contact. Using an existing shielding cover saves space, cost for material, assembly and plating and offers the possibility to reduce complexity by e.g. removing the shielding washer, gasket as well. At the same time the center pin and insulator can be produced as kind of a low cost cable semi-finished product and cut to desired length what achieves highest flexibility in board to board distances.

In a variation, a first and a second PCB connector are e.g. soldered to and/or pressed into an opening of the first and/or the second PCB or e.g. a filter housing. The connectors have a coaxial design. The connectors, which can also be used separately, usually comprise a flexible outer contact, e.g. in the form of a spring like cup washer which forms a contact to the shielding cover and a flexible center pin spring. The center pin spring axially contacts the center pin of the adapter middle part arranged by an insulator. If appropriate, the center pin can contact the center pin of the adaptor middle part in a radial way. The springs can be used to compensate axial and radial misalignments between board and shielding cover. If appropriate, the middle part (bullet, barrel) contains a center pin and an insulator without outer contact. The middle part may be made from a semi-finished product which is made by a cable production process and which is then cut to a defined length on customer demand. Depending on the field of application, the middle part can be produced by a machined (molded) insulator as well as machined center pin and assembled afterwards. As mentioned above, the coaxial connection usually requires a so called shielding cover which in addition may act as a mechanical distance holder between the first and the second printed circuit board as well as help to reduce or limit radio frequency leakage within the arrangement. Usually, no need exists e.g. for additional shielding washer, gasket, etc. as no inappropriate opening within shielding cover between upper and lower PCB is existing. Axial and radial misalignment are preferably compensated with the help of the spring parts of center and outer contact attached to the PCB connector on upper and lower PCB as described in more detail hereinafter. Typical kinds of washer might be cup springs at outer contact. On center pin diverse version of springs are possible. With the spring part connection of outer contact (cup washer) between PCB and shielding washer a very good RF leakage can be achieved (depending on Microstrip or Stripline design). Depending on the field of application, it even would be possible to remove the shielding cover at least partially. In order to achieve good RF contact on the outer contact, usually high surface pressures per contact point (about 300 N/mm2) are necessary such that, if present, oxidation and/or degradation of the contact surface can be broken through. In order to achieve low contact pressure force (in the range of 20 N) between the PCB and a shielding cover over, very specific designs of the cup washer and the contact points are necessary. Instead of a cup spring washer with direct galvanic contact to the shielding cover, a capacitive solution can be used to couple to the shielding cover eliminating the need for high contact pressures.

In a preferred variation the connector comprises a pedestal made from or coated by a conductive material and to be arranged on and electrically interconnected to a printed circuit board. The pedestal can e.g. be soldered to a printed circuit board or press-fit into a thereto foreseen opening of the printed circuit or a housing.

Furthermore, it comprises an in an axial direction perpendicular to the printed circuit board elastically deformable cup washer which is preferably arranged on a platform of the pedestal opposite to and in the mounted position facing away from the printed circuit board. The elastically deformable cup washer usually comprises several spring elements arranged annular and evenly distributed around a center opening of the pedestal. Depending on the field of application, they are, e.g. in the case of small distances, suitable to interconnect directly to a second printed circuit board. Alternatively, or in addition they can be interconnected via an adapter and a second connector of the same or a different design to a second printed circuit board. The spring elements are preferably arranged in a conically inclined manner on the pedestal pinpointing radial inwardly. Depending on the field of application, inverse arrangement may be appropriate. The spring elements may comprise at least one contact tip to enhance local contact pressure in a mounted position, i.e. when compressed. The elastically deformable cup washer is preferably made from stamped sheet metal. Good results can be achieved when the elastically deformable cup washer is arranged vertically above the center opening. In a preferred arrangement as shown, the pedestal comprises a platform on which the elastically deformable cup washer is arranged.

For longer board to board distances, the above mentioned three-piece part solution by using the shielding cover as outer contact is a preferred solution regarding cost, flexibility and RF performance. In a variation of the invention, a first connector as described hereinafter in more detail is used in a standalone manner without the adaptor part and without the second connector to achieve a direct to board connection with distances e.g. in the range of 5 mm or less. Such a connector can be achieved either with a specific center pin or with a center pin which can be shared with long board to board solution. The first, respective the second connectors should thus be considered as a separate inventive concept, which may be made subject of one or several divisional patent applications.

Good results can be achieved when the connector inner conductor is designed as disclosed and claimed in the Swiss patent application CH 01389/18 filed on Dec. 11, 2018 (P15572CH00), which is hereby incorporated by reference in its entirety. Therefore, the connector inner conductor may have a tubular design extending in the direction of a center axis. The conductor normally comprises a first and a second end section that are interconnected to each other by a pattern of transversal sections, stay sections and/or intermediate sections delimited from each other by slots forming a meander shaped grid section. The slots which, when looking at the conductor in a side view, may extend in viewing direction completely across the cross section, such that when looking at the conductor alone, it would be possible to look freely across the conductor despite the stay sections and/or the intermediate sections which interconnect the transversal sections in axial direction. The transversal sections normally extend from left to right and in the next row from right to left being part of the meander shaped structure. The transversal sections, respectively the slots of different rows can be arranged such that they overlap with respect to each other in axial direction. Alternatively, or in addition they can be arranged at the same position. Thereby the stay section would be in line with respect to each other.

The concept according to the invention offers a comparatively low cost connector by increased integration and offers the freedom of very high flexibility on board to board distances by the utilization of intermediate element which is produced in a high volume production process as used for the fabrication of a cables. Compared to the prior art, the invention offers a significant cost reduction. The concept according to the invention can e.g. be used for single channel board to board connections or multi-channel board to board connections (e.g. 2×2).

Usually, a board to board connector assembly according to the disclosure comprises a first connector suitable to be arranged on a first printed circuit board and a second connector suitable to be arranged on a second printed circuit board and an adapter suitable to be in a mounted position arranged between and interconnected to the first and the second connector. The adapter comprises an adapter inner conductor which in the mounted position is interconnected electrically conductive to a thereto corresponding connector inner conductor of the first and/or the second connector. An adapter outer conductor interconnects a connector outer conductor of the first connector and/or the second connector. The adapter outer conductor is preferably arranged separate and spaced apart from the adapter inner conductor. The adapter outer conductor is preferably concentric to the adapter inner conductor and surrounds it forming a seal with respect to the signal transmission through the adapter inner conductor. If present, usually an adapter dielectric element encompasses the inner conductor. In a mounted position it is preferably arranged between the first connector and the second connector leaving the end sections of the adapter inner conductor free, such that they can interconnect to the connector inner conductors. Good results can be achieved when the first connector and/or the second connector comprises an elastically deformable cup washer having a center opening. During operation the cup washer interconnects the adapter outer conductor to the respective printed circuit board electrically conductive and/or via capacitive coupling and/or via inductive coupling. In a preferred variation, the cup washer comprises several conically arranged spring elements. The spring elements are arranged on a pedestal circle pointing in an inclined manner conically inwardly. Good spring characteristic can be achieved when the spring elements are interconnected to each other in circumferential direction meander-shaped. Other arrangements are possible.

If appropriate, the cup washer can be arranged on a pedestal comprising a center opening. A connector inner conductor is arranged at least partially in and positioned by the center opening of the pedestal. To obtain a preferably compensation characteristic, the connector inner conductor can be made elastically deformable. It can comprise spring elements at the end which are suitable to interconnect to the adapter inner conductor.

The adapter outer conductor may be incorporated, respectively integrated, in a spacer element arranged in a mounted position between the first and the second printed circuit board. Good results can be achieved when the spacer element is made from aluminum die cast and/or injection molded plastic, which consist of electrically conductive material or is at least covered by an electrically conductive layer of material. The spacer element in a mounted position may be supported with respect to at least one printed circuit board via the elastically deformable cup washer. Alternatively, or in addition the spacer element the spacer element provides direct or indirect support of the first and the second printed circuit board setting the distance between them. If appropriate, the spacer element may comprise at least one fastening means to in the mounted position, mechanically interconnect to at least one printed circuit board. Good results can be achieved if the fastening means are based on a screw connection. The adapter inner conductor preferably is of a cable type, i.e. made by a process usually used to produce cables. The adapter inner conductor can be laterally supported by the adapter dielectric element surrounding the adapter inner conductor.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
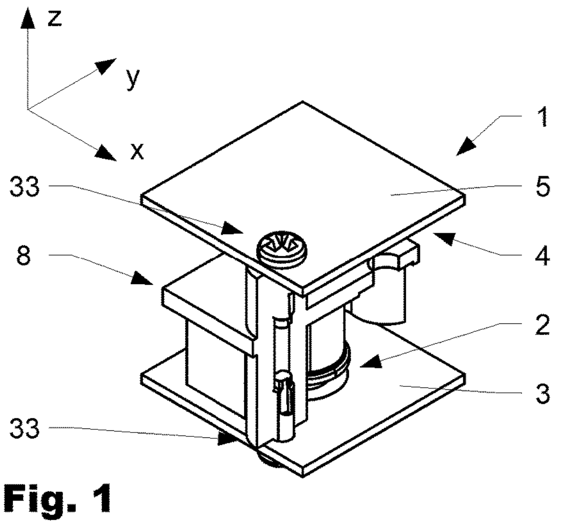
FIG. 1 is a first variation of a B2B connector assembly in a perspective view.
Figure 2:
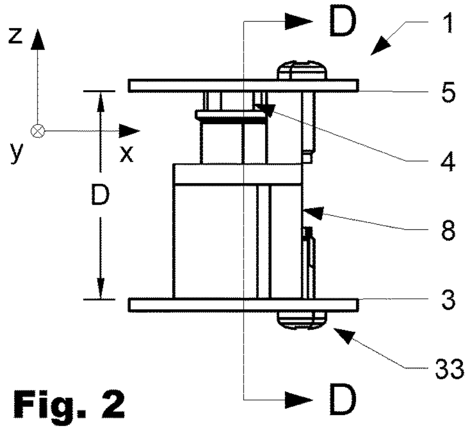
FIG. 2 is the B2B connector assembly according to FIG. 1 in a side view.
Figure 3:
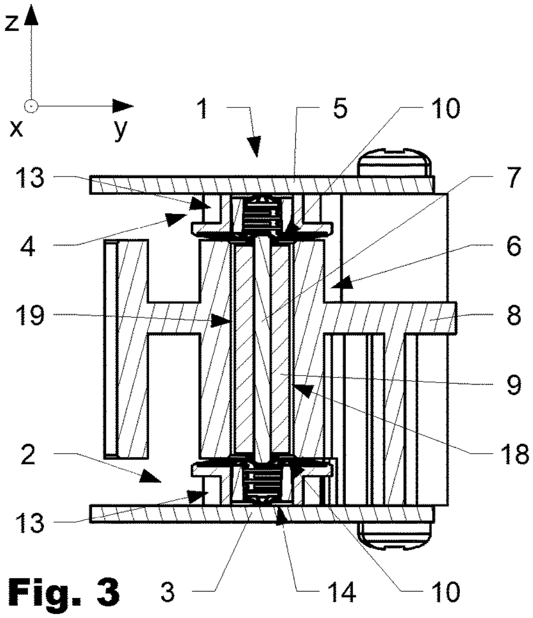
FIG. 3 is a section view along section line DD according to FIG. 2.
Figure 4:
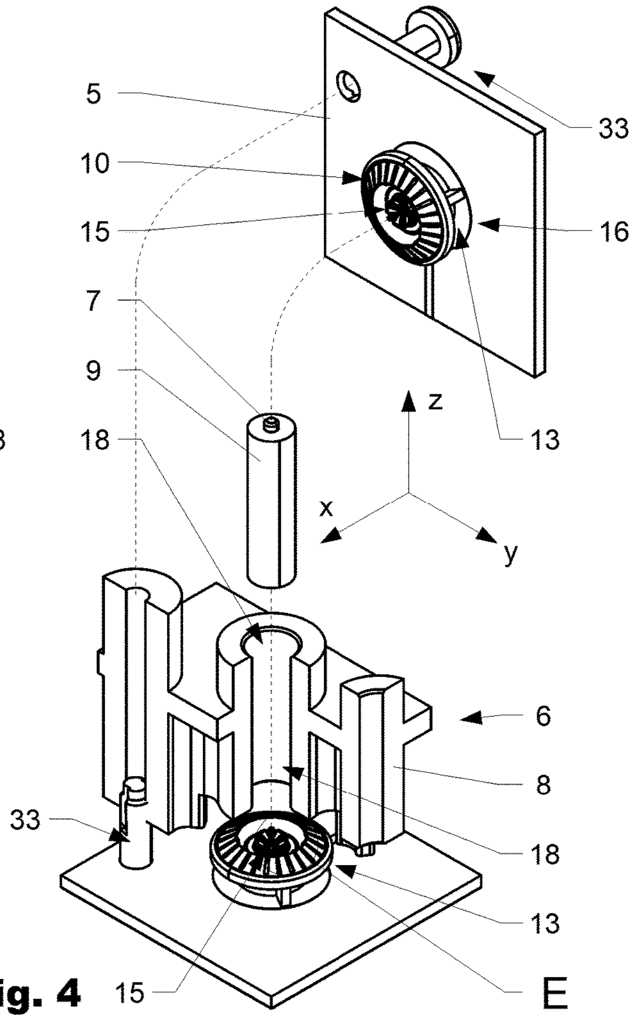
FIG. 4 is the B2B connector assembly in an exploded view, partially cut.
Figure 5:
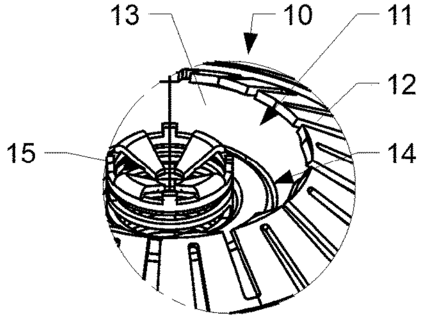
FIG. 5 is detail E according to FIG. 3.
Figure 6:
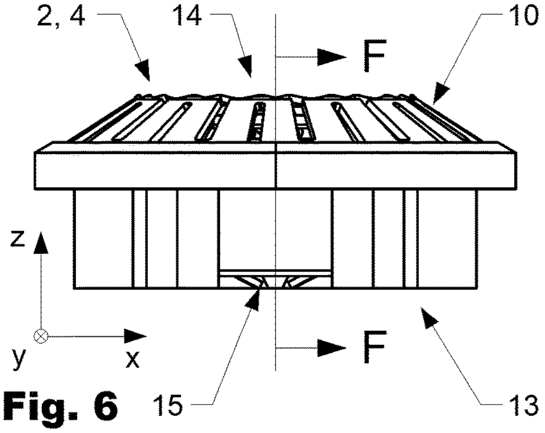
FIG. 6 is a connector in a side view.
Figure 7:
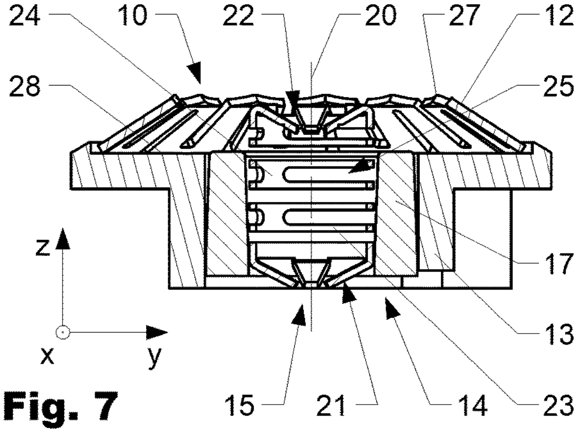
FIG. 7 is a section view of the connector along section line FF.
Figure 8:
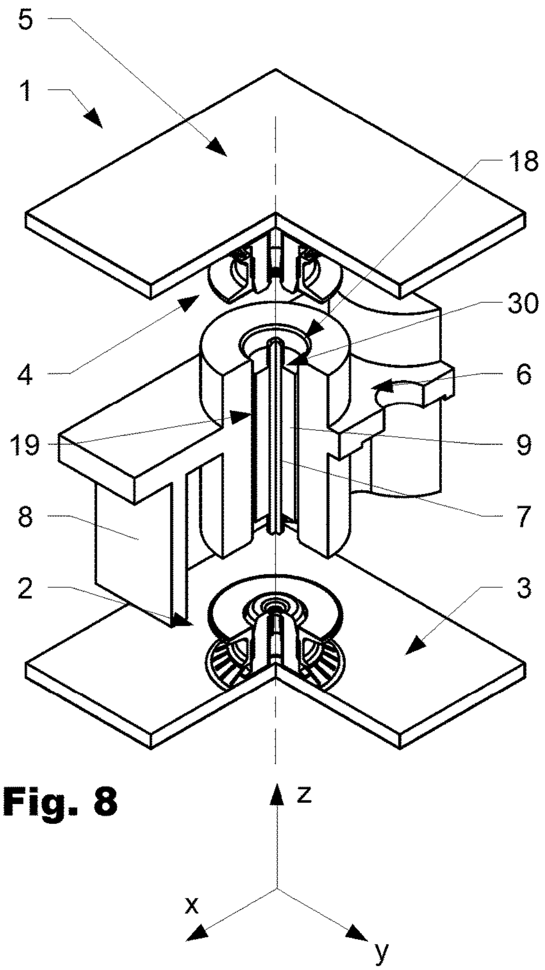
FIG. 8 is a second variation of a B2B connector assembly in a perspective view.
Figure 9:
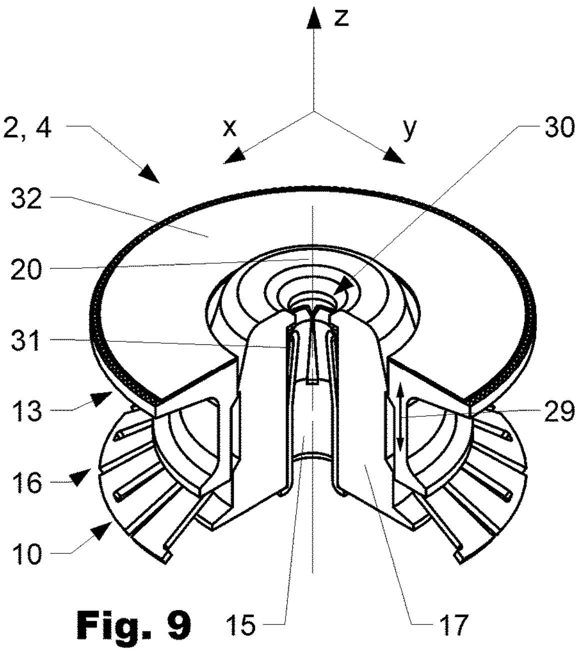
FIG. 9 is a connector according to the second variation.
Figure 10:
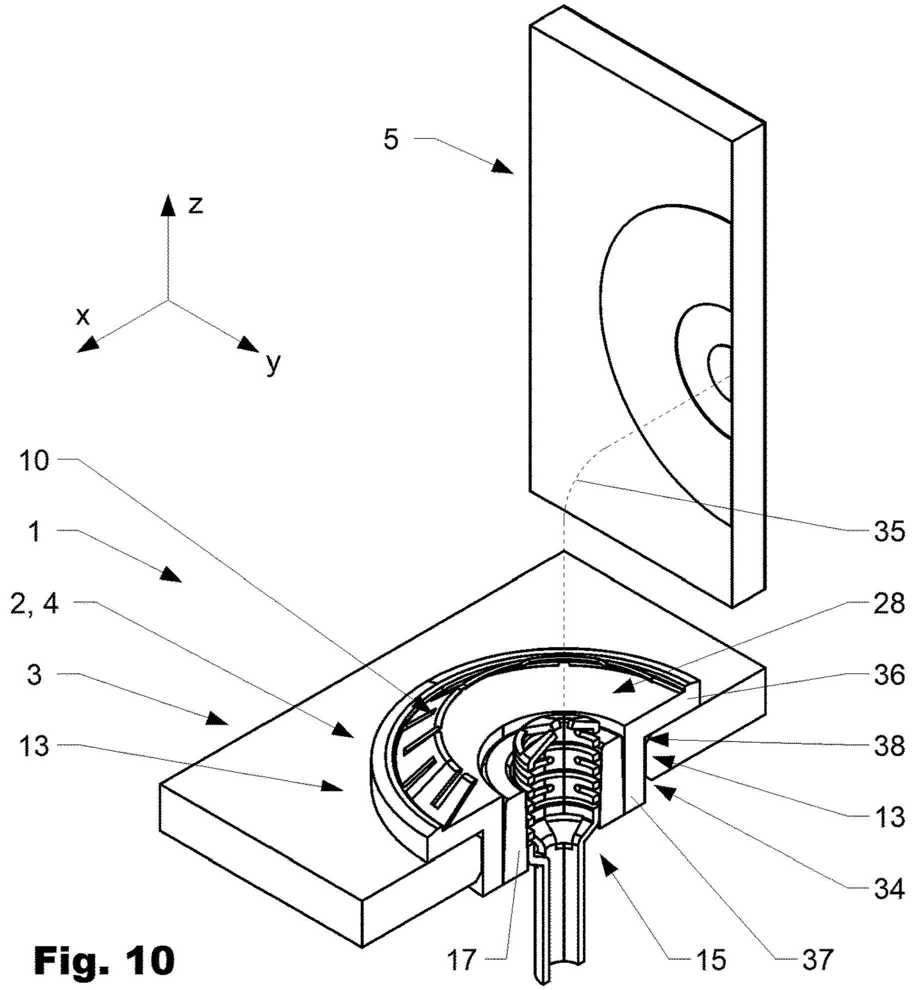
FIG. 10 is a third variation of a connector.
Figure 11:
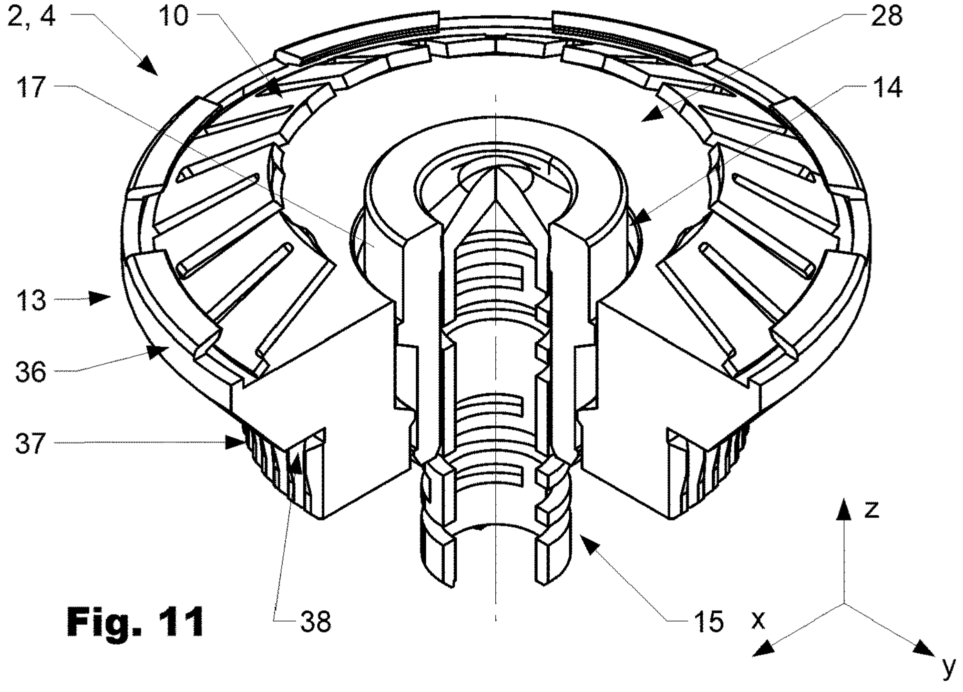
FIG. 11 is a fourth variation of a connector.

FIG. 1 shows a first variation of a board to board connector assembly 1 (B2B connector assembly) in a perspective view. FIG. 2 is showing the B2B connector assembly according to FIG. 1 in a side view. FIG. 3 shows a section view along section line DD according to FIG. 2 and FIG. 4 shows the B2B connector assembly in an exploded view, partially cut such that the inside becomes apparent. FIG. 5 shows detail E according to FIG. 3. FIG. 6 shows a connector 2 in a side view and FIG. 7 show the connector 2 in a section view along section line FF of FIG. 6. FIG. 8 shows a second variation of a B2B connector assembly 1 in a perspective view. FIG. 9 shows a connector 2 according to the second variation. FIG. 10 shows a connector 2 according to a third variation and FIG. 11 shows a connector 2 according to a fourth variation.

The board to board connector assembly 1 usually comprises a coaxial first connector 2 suitable to be arranged on a first printed circuit board 3 and a coaxial second connector 4 suitable to be arranged on a second printed circuit board 5. The first and the second printed circuit boards 3, 5 are during operation arranged substantially parallel to each other. In the mounted position an adapter 6 is arranged between the first and the second connector 2, 4. The adapter 6 is interconnected electrically as well as mechanically to the first and the second printed circuit board 3, 5 as will be described in more detail hereinafter. The adapter 6 comprises an adapter inner conductor 7 and an adapter outer conductor 8. Both form part of the interconnection between the first connector 2 and the second connector 4. As can be seen in the drawings, the adapter outer conductor 8 is usually arranged separate from the adapter inner conductor 7. Good results can be achieved, when an adapter dielectric element 8 encompasses the inner conductor 7. The adapter dielectric element 8 is usually arranged between the first connector 2 and the second connector 3. Good results can be achieved when the first connector 2 and/or the second connector 4 comprise an in a connection direction (z-direction) elastically deformable cup washer 10 having a center opening 11, the cup washer 10 interconnecting the adapter outer conductor 8 to the respective printed circuit board 3, 5. Furthermore, the cup washer 10 may comprise several conically arranged spring elements 12 which support the elastic deformability. The spring elements 12 can have different shapes and arrangements. Preferably they are arranged interconnected to each other in circumferential direction in a meander-shaped manner. The cup washer 10 can be arranged on a pedestal 13 spaced a distance apart from the respective printed circuit board, 3, 5. Depending on the design, the pedestal may comprise a center opening 14. A connector inner conductor 15 may be arranged at least partially in the center opening 14 of the pedestal 13 where it can be held with respect to the pedestal 13 by a connector dielectric element 17. The pedestal 13 can be arranged on the respective printed circuit board 3, 5 or at least partially in an opening of the respective printed circuit board 3, 5. For through connectivity, the connector inner conductor 15 may be designed elastically deformable and suitable to easily interconnect to the adapter inner conductor 7.

The adapter outer conductor 8 may be incorporated in a spacer element 8 arranged in a mounted position between the first and the second printed circuit board 3, 5. The spacer element 8 can be supported with respect to at least one printed circuit board 3, 5 via the elastically deformable cup washer 10. As visible e.g. in FIG. 1, the spacer element 8 may provide support of the first and the second printed circuit board 3, 5 defining a distance D between them. If appropriate, the spacer 8 comprises at least one fastening means 33 to mechanically interconnect to at least one printed circuit board 3, 5. The adapter inner conductor 7 may be of a cable type wherein the adapter inner conductor is laterally supported by the adapter dielectric element 9.

As shown in the drawings, the spacer element 8, which may act simultaneously as the outer conductor, may comprise several bores 18 spaced apart from each other in a lateral direction. The spacer element 16 may be interconnected in the area of each bore 18 via a first and/or second connector 2, 4 to the first and/or second printed circuit board 3, 5.

FIG. 6 shows a connector 2, 4 in a side view. FIG. 7 shows a section view of the connector 2, 4 along section line FF according to FIG. 6. The first, respectively the second connector 2, 4 have at least in the upper region an essentially rotational symmetrical pedestal 13 on which an elastically deformable cup washer 10 is arranged. The elastically deformable cup washer 10 along with the pedestal 13 form part of the connector outer conductor 16. A connector inner conductor 15 is arranged inside a center opening 14 of the pedestal 13. It is held with respect to the pedestal 13 by a connector dielectric element 17.

Good results can be achieved when the connector inner conductor 15 is designed as disclosed and claimed in the Swiss patent application CH 01389/18 filed on Dec. 11, 2018 (P15572CH00), which is hereby incorporated by reference in its entirety. As visible in FIG. 7 the connector inner conductor 15 may have an essentially tubular design extending in the direction of a center axis 20. The conductor comprises a first and a second end section 21, 22 that are interconnected to each other by a pattern of transversal sections 23, stay sections 24 and/or intermediate sections (not visible in the shown drawing) delimited from each other by slots 25 forming a meander shaped grid section 26. The slots which, when looking at the conductor in a side view, may extend in viewing direction completely across the cross section, such that when looking at the conductor alone, it would be possible to look freely across the conductor despite the stay sections and/or the intermediate sections which interconnect the transversal sections in axial direction. The center pin spring axially contacts the center pin (adapter inner conductor) 7 of the adapter 6 arranged by an insulator. If appropriate, the center pin can contact the center pin of the adaptor middle part in a radial way. The springs can be used to compensate axial and radial misalignments between board and shielding cover.

As visible in the shown variation, the at least one connector 2, 4 is suitable to be used in a board to board connector assembly 1. The connector 2, 4 comprises a pedestal 13 to be arranged on and interconnected to a printed circuit board 3, 5. Furthermore it comprises an in an axial direction (here z-direction) perpendicular to the printed circuit board 3, 5 elastically deformable cup washer 10 which is arranged on a platform 28 of the pedestal 13 opposite to and facing away from the printed circuit board 3, 5. The elastically deformable cup washer 10 comprises several spring elements 12 arranged annular around a center opening 14 of the pedestal 13. Depending on the field of application, they are, e.g. in the case of small distances, suitable to be interconnect directly to a second printed circuit board 3, 5. Alternatively or in addition they can be interconnected via an adapter 6 as e.g. described herein above. The spring elements 12 are preferably arranged in a conically inclined manner on the pedestal 13 pinpointing radial inwardly. The spring elements 12 may comprise at least one contact tip 27 to enhance local contact pressure in a mounted position, i.e. when compressed. The elastically deformable cup washer 10 is preferably made from stamped sheet metal. Good results can be achieved when the elastically deformable cup washer 10 is arranged above the center opening 14. In a preferred arrangement as shown, the pedestal 13 comprises a platform 28 on which the elastically deformable cup washer 10 is arranged.

FIG. 8 shows a second variation of a connector assembly 1 and FIG. 9 shows a connector 2, 4 according to the connector assembly 1 according to FIG. 8. The connector assembly 1 and the connector 2, 4 are shown in a partially sectioned manner, such that the inside becomes apparent. The general setup corresponds to the previous drawings and the thereto related specification. Therefore, only the differences are explained hereinafter.

When looking at FIG. 9 it becomes apparent, that the connector 2, 4 comprises an elastically deformable cup washer 10 which in this variation is arranged below the pedestal 13. The connector dielectric element 17 is arranged inside a center opening 14 of the pedestal 13. As indicated by arrow 29, the pedestal 13 is arranged displaceable in axial direction (z-direction) with respect to the connector dielectric element 17 which in the shown variation is in a mounted position usually mechanically interconnected to the printed circuit board 3, 5 via the inner conductor 15. The inner conductor and/or the dielectric element 17 are soldered and/or pressed in and/or screwed and/or glued to the printed circuit board 3.

The connector inner conductor 15 is arranged in a center opening 30 of the connector dielectric element 17. In difference to the first variation the connector inner conductor 15 is of a tubular design having comprising several spring tongues 31 at the upper end acting in a radial direction with respect to the center axis 20. Alternatively, or in addition a connector inner conductor according to the first variation can be used in this second variation of the connector 2, 4.

If appropriate, the elastically deformable cup washer 10 may interconnect the adapter outer conductor 8 electrically conductive and/or via capacitive coupling and/or via inductive coupling. In the shown variation this is indicated by layer 32 arranged at an upper end of the pedestal 13 foreseen to interconnect in the mounted position to the adapter outer conductor 8.

FIG. 10 shows a section view of a first and a second circuit board 3, 5 and a connector 2, 4. The general setup of the connector 2, 4 corresponds to the other variations described herein. With respect to the general description reference is made to the description of them which also applies here. The pedestal 13 is arranged in an opening 34 of the first circuit board 3. Good results can be achieved, when the pedestal 13 is press-fit into the opening 34. The connector 2, 4 can also be used to be arranged in an opening of a housing 3, e.g. of a filter or another electronic device. General interaction with the second printed circuit board 5 is indicated by dotted line 35. FIG. 11 is showing a further variation of the connector 2, 4 according to the disclosure. The connector 2, 4 comprises a pedestal 13 to be arranged on and interconnected e.g. to a printed circuit board or a housing. The pedestal 13 comprises an upper section 36 and a lower section lower section 37 having a smaller diameter then the upper section 36. Between the upper section 36 and the lower section 37 the pedestal 13 comprises a shoulder 38 which acts as a stop when the lower section 37 is arranged in an opening 34 of printed circuit board or the wall of a housing (see e.g. FIG. 10).

Rather, the words used in the specification are words of description rather than limitation, and it is understood that various changes may be made without departing from the Spirit and scope of the invention.

The invention claimed is:

1. A connector (2, 4) suitable to be used as a first connector (2) and/or second connector (4) in a board to board connector assembly (1), comprising:
- a pedestal (13) comprising a platform (28) and to be arranged on and interconnected to a printed circuit board (3, 5) and in an axial direction (z) perpendicular to the printed circuit board (3, 5), an elastically deformable cup washer (10) arranged on the platform (28) of the pedestal (13) opposite to the printed circuit board (3, 5) and comprising several spring elements (12) arranged annularly around a center opening (14) of the pedestal (13) suitable to interconnect to a second printed circuit board (3, 5) via an adapter (6) and/or directly.

2. The connector (2, 4) according to claim 1, wherein spring elements (12) are arranged in a conically inclined manner on the pedestal (13) pinpointing radially inwardly.

3. The connector (2, 4) according to claim 1, wherein spring elements (12) each comprise at least one contact tip (27) to enhance local contact pressure in a mounted position.

4. The connector (2, 4) according to claim 1, wherein the elastically deformable cup washer (10) is made from stamped sheet metal.

5. The connector (2, 4) according to claim 1, wherein the elastically deformable cup washer (10) is arranged above the center opening (14).

6. The connector (2, 4) according to claim 1, wherein the pedestal (13) comprises a platform (28) on which the elastically deformable cup washer (10) is arranged.

7. The connector (2, 4) according to claim 1, wherein the pedestal (13) comprises an upper section (36) and a lower section (37) having a smaller diameter then the upper section (36) and formed to be arranged in an opening (34) of the printed circuit board (3) or a wall of a housing.

8. The connector (2, 4) according to claim 7, wherein a shoulder (38) is arranged between the upper section (36) and the lower section (37) and which acts as a stop when the lower section (37) is arranged in the opening (34).

9. A board to board connector assembly (1) comprising:

a. a first connector (2) suitable to be arranged on a first printed circuit board (3) and b. a second connector (4) suitable to be arranged on a second printed circuit board (5) and c. an adapter (6) suitable to be arranged in a mounted position between and interconnected to the first and the second connector (2, 4), the adapter (6) comprising an adapter inner conductor (7); and an adapter outer conductor (8) interconnecting the first connector (2) and the second connector (4), wherein d. the first connector (2) and/or the second connector (4) is a connector (2,4) according to claim 1.

10. The board to board connector assembly (1) according to claim 9, wherein the adapter outer conductor (8) is arranged separate from the adapter inner conductor (7) and comprises a bore (18) in which the adapter inner conductor (7) is arranged.

11. The board to board connector assembly (1) according to claim 10, wherein an adapter dielectric element (9) supports the inner conductor (7) in a lateral direction and is arranged between the first connector (2) and the second connector (4).

12. The board to board connector assembly (1) according to claim 11, wherein the adapter dielectric element (9) is spaced a distance apart from the bore (18) by a gap (19).

13. The board to board connector assembly (1) according to claim 11, wherein the adapter inner conductor (7) is of a cable type wherein the adapter inner conductor (7) is laterally supported by the adapter dielectric element (9).

14. The board to board connector assembly (1) according to claim 13, wherein the adapter dielectric element (9) is made in a continuous process by extrusion and/or tape wrapping onto the adapter inner conductor (7).

15. The board to board connector assembly (1) according to claim 9, wherein the first connector (2) and/or the second connector (4) comprises an elastically deformable cup washer (10) having a center opening (11), the cup washer (10) interconnecting the adapter outer conductor (8) to the respective printed circuit board (3, 5).

16. The board to board connector assembly (1) according to claim 15, wherein the cup washer (10) comprises several conically arranged spring elements (12).

17. The board to board connector assembly (1) according to claim 16, wherein the spring elements (12) are interconnected to each other in circumferential direction meander-shaped.

18. The board to board connector assembly (1) according to claim 15, wherein the cup washer (10) is arranged above and/or below a pedestal (13) comprising a center opening (14).

19. The board to board connector assembly (1) according to claim 18, wherein a connector inner conductor (15) is arranged at least partially in the center opening (14) of the pedestal (13).

20. The board to board connector assembly (1) according to claim 19, wherein the connector inner conductor (15) is elastically deformable and suitable to interconnect to the adapter inner conductor (7) in an axial and/or radial manner.

21. The board to board connector assembly (1) according to claim 15, wherein the spacer element (8) in a mounted position is supported with respect to at least one printed circuit board (3, 5) via the elastically deformable cup washer (10).

22. The board to board connector assembly (1) according to claim 15, wherein the cup washer (10) interconnects the adapter outer conductor (8) to the respective printed circuit board (3, 5) via capacitive coupling.

23. The board to board connector assembly (1) according to claim 9, wherein the connector inner conductor (15) and the pedestal (13) are arranged displaceable with respect to each other.

24. The board to board connector assembly (1) according to claim 9, wherein the adapter outer conductor (8) is incorporated in a spacer element (8) arranged in a mounted position between the first and the second printed circuit board (3, 5).

25. The board to board connector assembly (1) according to claim 24, wherein the spacer element (8) comprises at least one fastening means (33) to mechanically interconnect to at least one printed circuit board (3, 5).

26. The board to board connector assembly (1) according to claim 24, wherein the spacer element (8) comprises several bores (18) spaced apart from each other in a lateral direction and in which in the mounted position in each an adapter inner conductor (7) is arranged, wherein the spacer element is interconnected in the area of each bore (18) via a first and/or a second connector (2, 4) to the first and/or the second printed circuit board (3, 5).

* * * * *